United States Patent
Kim

(10) Patent No.: US 10,173,909 B2
(45) Date of Patent: Jan. 8, 2019

(54) TUBULAR FLUID PURIFICATION APPARATUS

(71) Applicant: SEOUL VIOSYS CO., LTD., Ansan-si (KR)

(72) Inventor: Jae Jo Kim, Ansan-si (KR)

(73) Assignee: SEOUL VIOSYS CO., LTD., Ansan-si (KR)

(*) Notice: Subject to any disclaimer, the term of this patent is extended or adjusted under 35 U.S.C. 154(b) by 0 days.

(21) Appl. No.: 15/541,163

(22) PCT Filed: Dec. 8, 2015

(86) PCT No.: PCT/KR2015/013375
§ 371 (c)(1),
(2) Date: Jun. 30, 2017

(87) PCT Pub. No.: WO2016/108459
PCT Pub. Date: Jul. 7, 2016

(65) Prior Publication Data
US 2017/0355622 A1 Dec. 14, 2017

(30) Foreign Application Priority Data
Dec. 31, 2014 (KR) ........................ 10-2014-0194675

(51) Int. Cl.
*C02F 1/32* (2006.01)

(52) U.S. Cl.
CPC ........ *C02F 1/325* (2013.01); *C02F 2201/328* (2013.01); *C02F 2201/3222* (2013.01); *C02F 2201/3227* (2013.01); *C02F 2301/024* (2013.01); *C02F 2301/026* (2013.01); *C02F 2303/04* (2013.01)

(58) Field of Classification Search
CPC .... C02F 1/32; C02F 1/325; C02F 2201/3222; C02F 2201/3227; C02F 2301/026; C02F 230/043; C02F 2303/04; A61L 2/08; A61L 2/10
See application file for complete search history.

(56) References Cited

U.S. PATENT DOCUMENTS

| 6,332,981 | B1 | 12/2001 | Loyd |
| 8,541,758 | B1 | 9/2013 | Filson et al. |
| 2003/0217978 | A1 | 11/2003 | Safta |
| 2005/0183996 | A1 | 8/2005 | Zemel |

(Continued)

OTHER PUBLICATIONS

International Search Report in International Application No. PCT/KR2015/013375, dated Mar. 8, 2016, 2 pages.

*Primary Examiner* — David E Smith
(74) *Attorney, Agent, or Firm* — Perkins Coie LLP

(57) ABSTRACT

A tubular fluid purification apparatus includes a guide part provided with an inlet port into which fluid is drawn, a discharge part provided with an outlet port from which the fluid is discharged, a conduit part configured to provide a space for flow of the fluid between the guide part and the discharge part, and a purification of unit supported on an inner surface of the conduit part and disposed to face the fluid flowing from the guide part to the discharge part. The purification unit includes a vortex generation part including a support and an opening formed in the support, and a light emitting diode disposed on the support at a position adjacent to the opening and configured to provide ultraviolet light.

18 Claims, 6 Drawing Sheets

(56) References Cited

U.S. PATENT DOCUMENTS

| | | | |
|---|---|---|---|
| 2005/0242013 A1 | 11/2005 | Hunter et al. | |
| 2005/0263716 A1* | 12/2005 | From | A61L 2/10 |
| | | | 250/453.11 |
| 2011/0024365 A1* | 2/2011 | Yong | C02F 1/325 |
| | | | 210/748.1 |
| 2015/0114912 A1* | 4/2015 | Taghipour | C02F 1/325 |
| | | | 210/748.11 |

* cited by examiner

[Fig. 1]
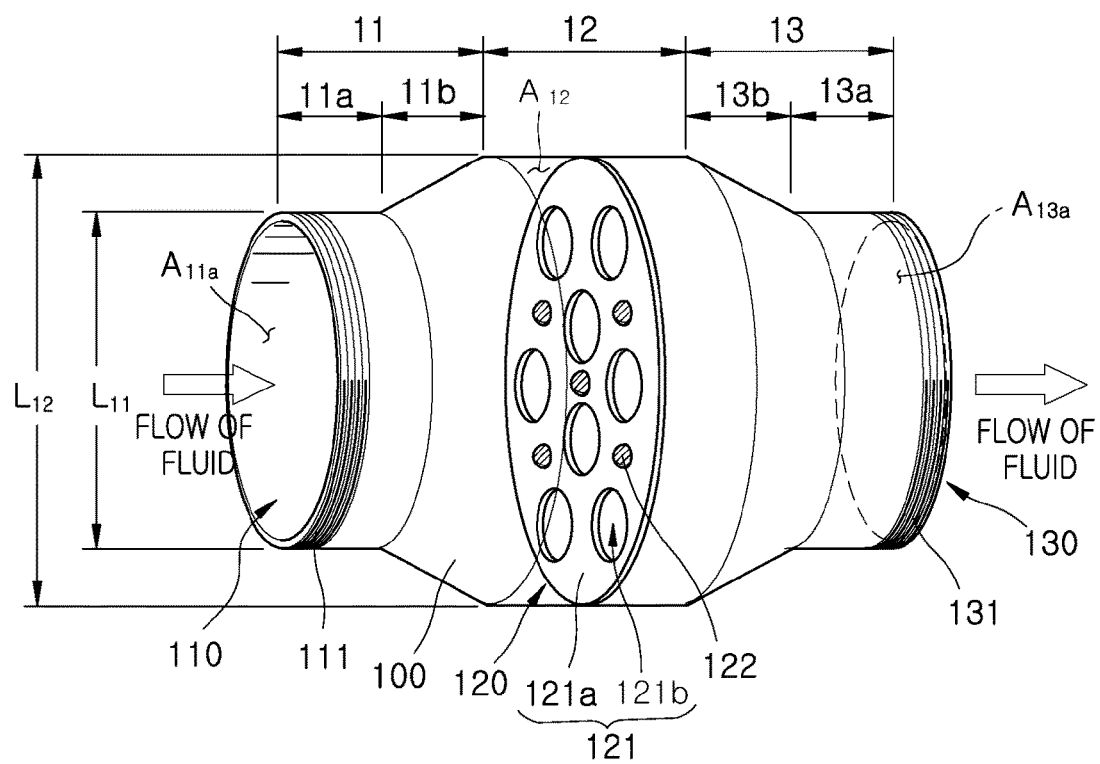

[Fig. 2]
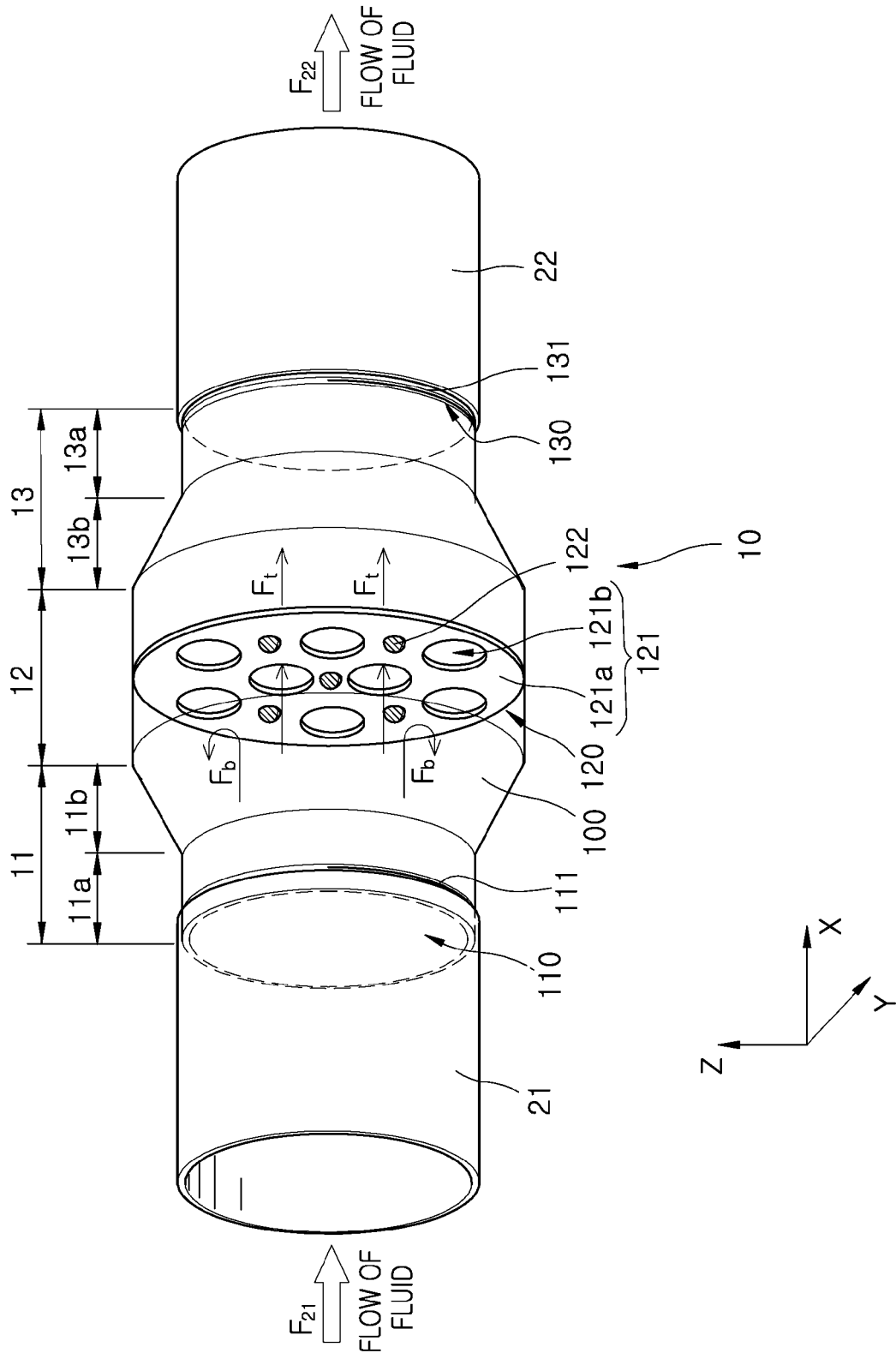

[Fig. 3]
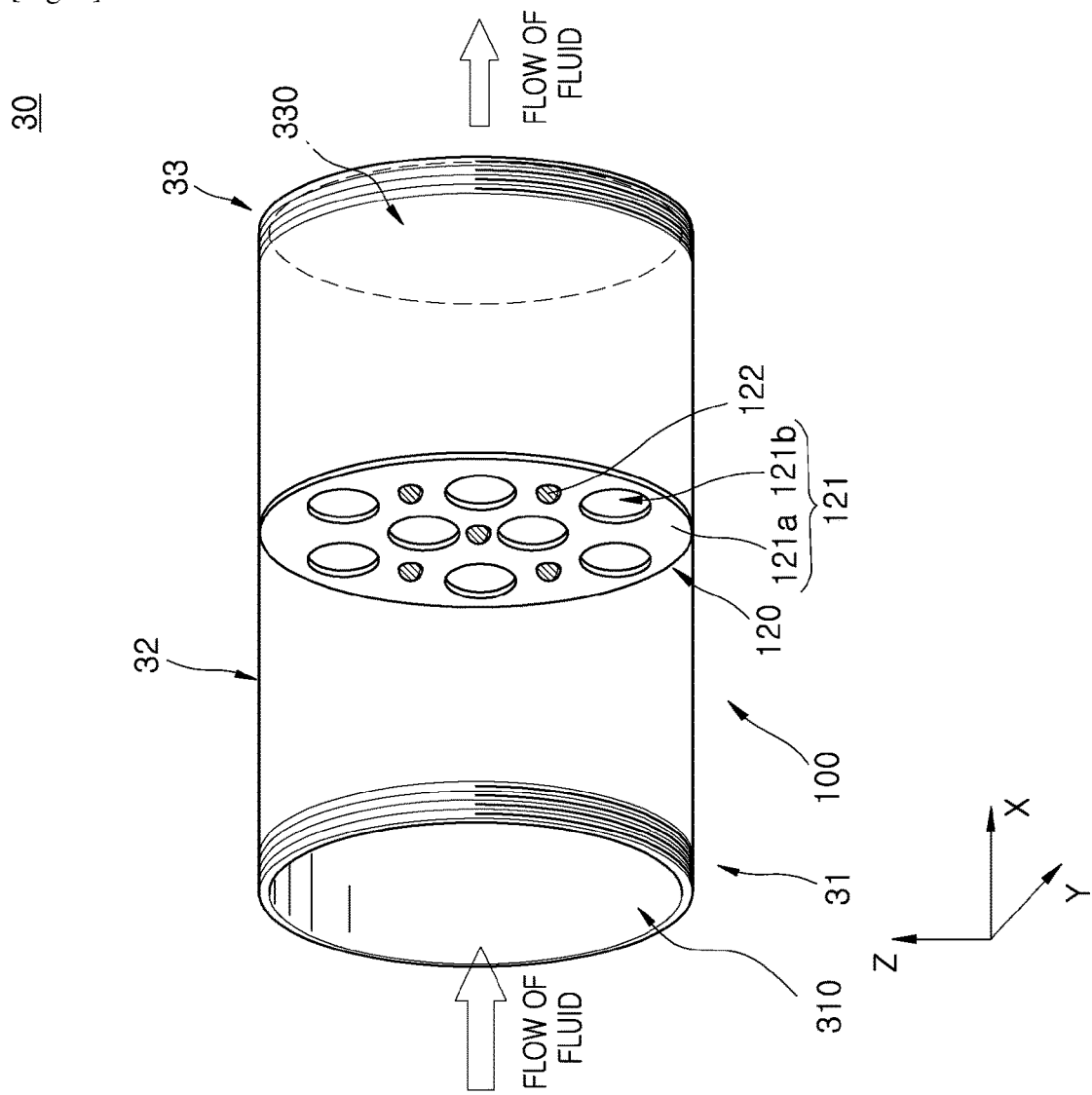

[Fig. 4]
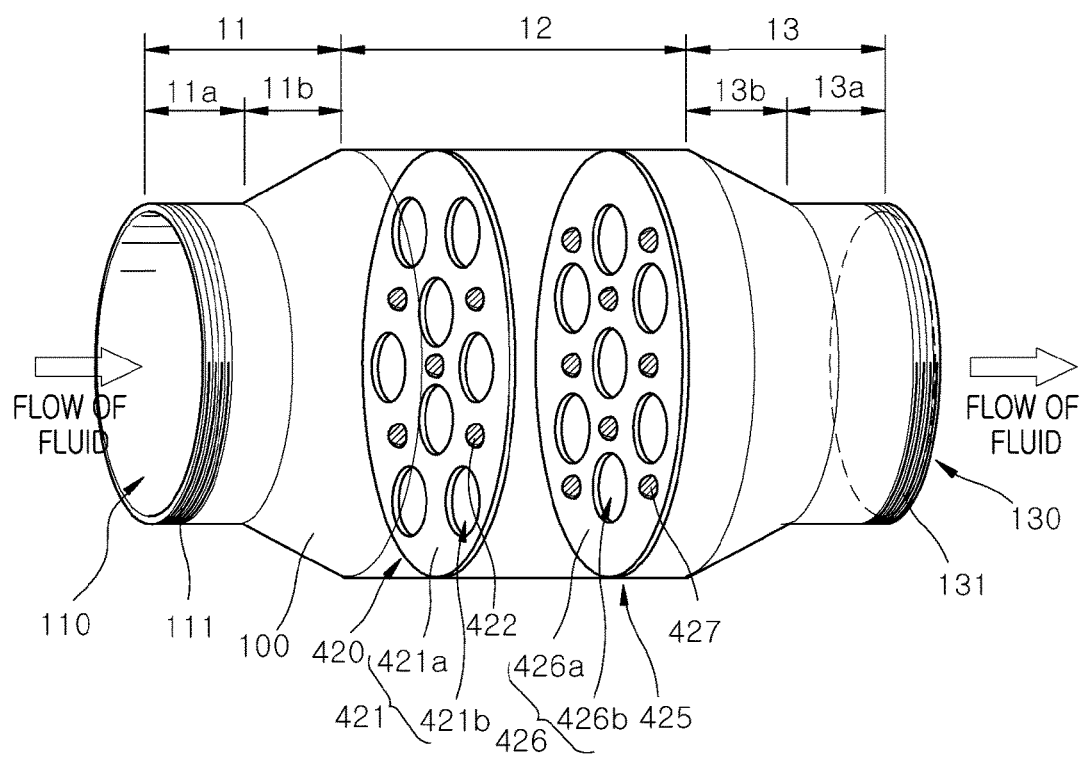

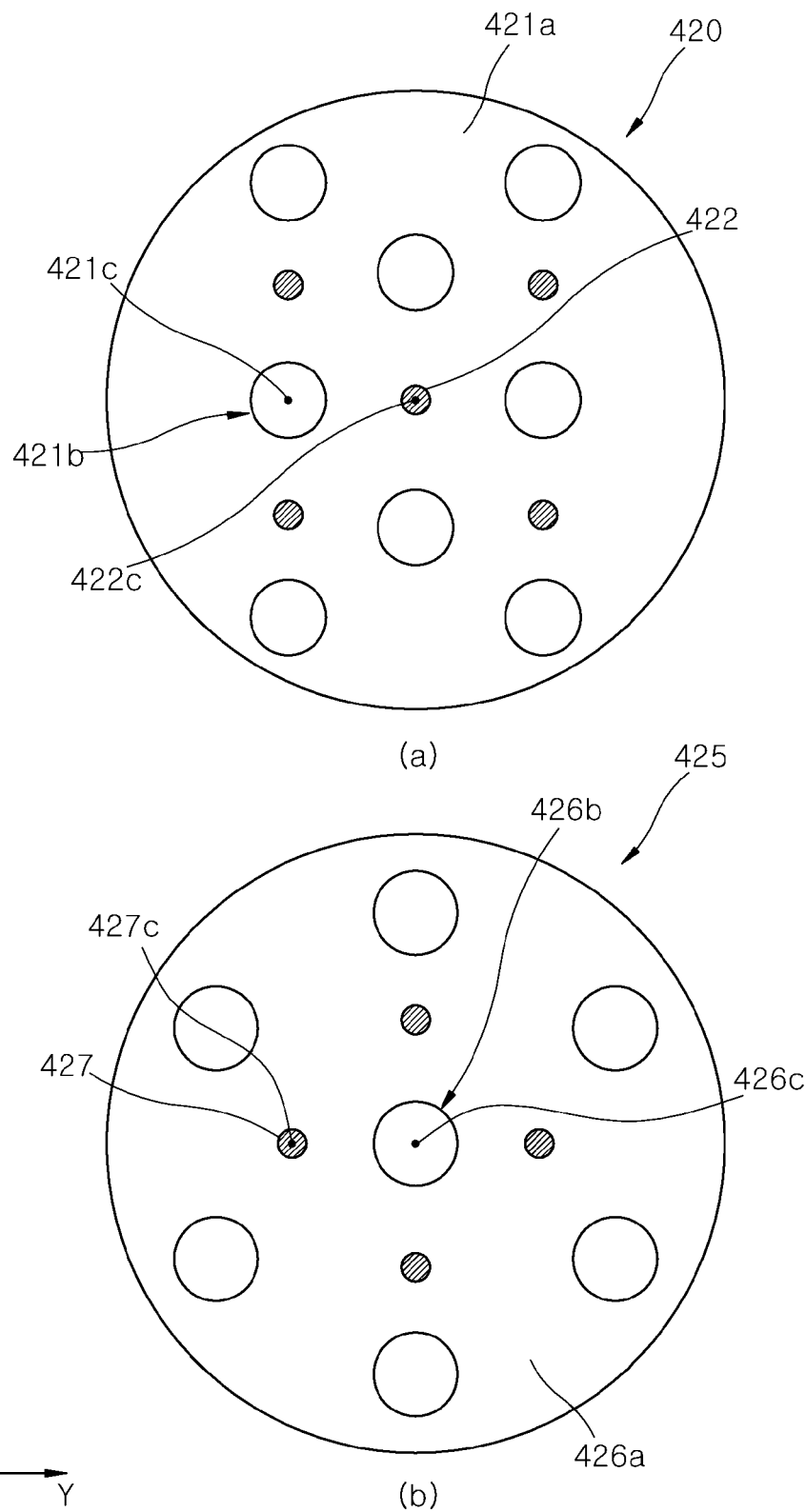
[Fig. 5]

[Fig. 6]
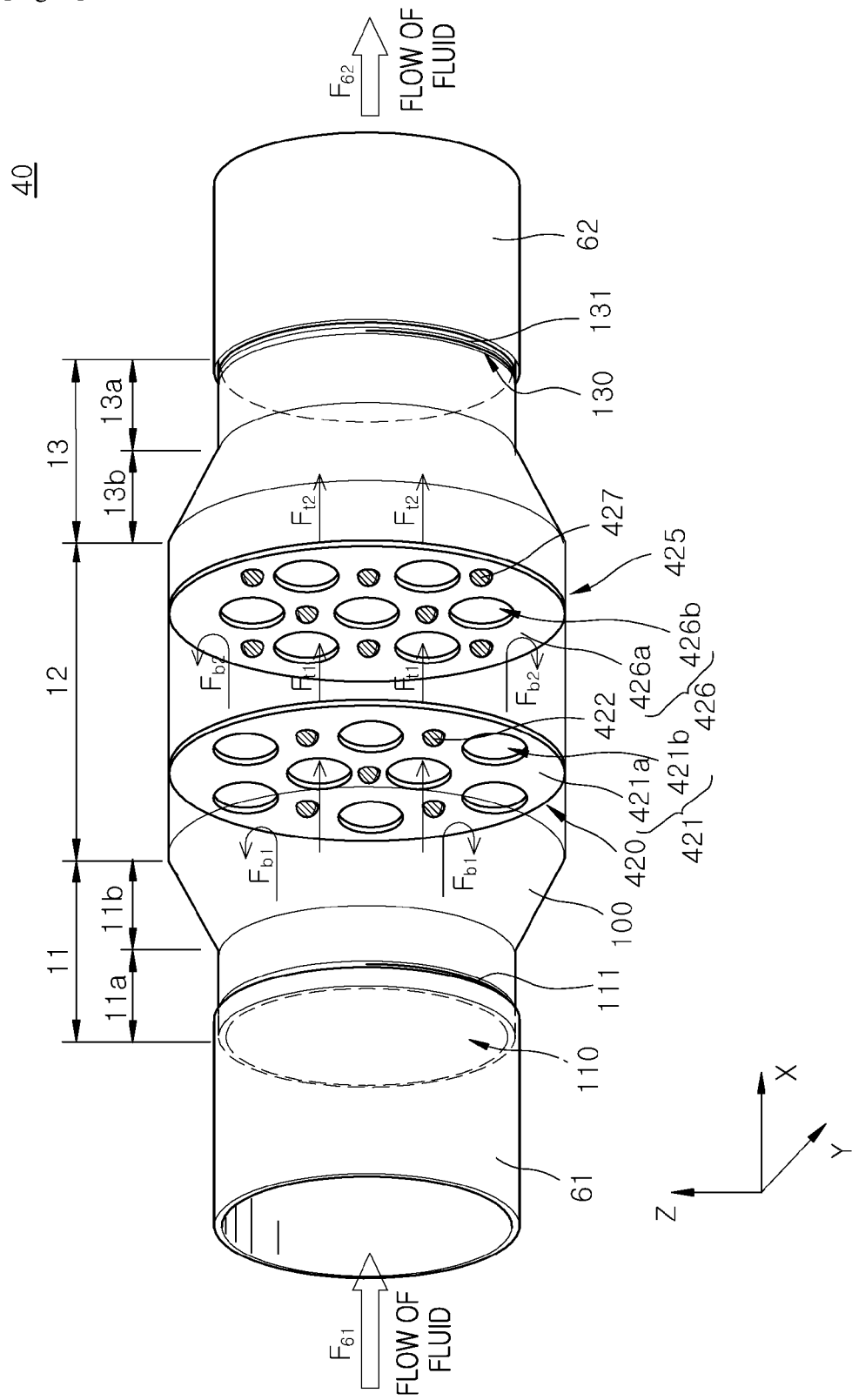

TUBULAR FLUID PURIFICATION APPARATUS

CROSS REFERENCE TO RELATED APPLICATIONS

This patent document is a 35 U.S.C. § 371 National Stage application of PCT Application No. PCT/KR2015/013375, filed on Dec. 8, 2015, which further claims the benefits and priorities of prior Korean Patent Application No. 10-2014-0194675 filed on Dec. 31, 2014. The entire disclosures of the above applications are incorporated by reference in their entirety as part of this document.

TECHNICAL FIELD

Exemplary embodiments of the present disclosure relate to an apparatus for purifying fluid, and more particularly, to an apparatus for purifying fluid flowing in a pipe.

BACKGROUND ART

Recently, due to deterioration of environmental factors, risk of air pollution and water pollution in living space is increasing. To cope with such risk, fluid purification apparatuses such as air cleaners, water purifiers, etc. have been proposed in related industries.

As an example, water purifiers are classified into a natural filtration type, a direct-connection filtration type, an ion-exchange resin type, a distillation type, a reverse osmosis type, etc. according to a purification method. Recently, methods of directly sterilizing target water using ultraviolet light have been proposed.

In most conventional methods using ultraviolet light, target water to be treated is contained in a container having a predetermined volume. An ultraviolet light source is thereafter immersed in the target water and then turned on to sterilize the water. However, such an immersion type sterilization method is problematic in that it takes a relatively long time to sterilize target water by radiating ultraviolet light into the water, and it is difficult to uniformly sterilize the entirety of water in the container. A representative conventional technique using such an immersion type sterilization method was introduced in Korean Patent Unexamined Publication No. 2012-0134809.

DISCLOSURE OF INVENTION

Technical Problem

An embodiment of the present disclosure relates to an apparatus having a simple structure capable of efficiently purifying fluid.

Solution to Problem

In one embodiment, a tubular fluid purification apparatus may include: a guide part including an inlet port into which fluid is drawn; a discharge part including an outlet port from which the fluid is discharged; a conduit part configured to provide a space for flow of the fluid between the guide part and the discharge part; and a purification unit supported on an inner surface of the conduit part and disposed to face the fluid flowing from the guide part to the discharge part, wherein the purification unit may include: a vortex generation part including a support and an opening formed in the support; and a light emitting diode disposed on the support at a position adjacent to the opening and configured to provide ultraviolet light.

Advantageous Effects of Invention

According to the present disclosure, the time it takes for fluid to remain around a vortex generation part while the fluid flows through a conduit part can be increased. Therefore, fluid around the vortex generation part can be exposed to ultraviolet light emitted from a light emitting diode for a sufficient period of time and thus effectively purified.

As described above, according to embodiments of the present disclosure, the efficiency of purifying fluid in the conduit part can be markedly enhanced by the vortex generation part.

BRIEF DESCRIPTION OF DRAWINGS

FIG. 1 is a perspective view illustrating a tubular fluid purification apparatus according to an embodiment of the present disclosure.

FIG. 2 is a view illustrating the operation of the tubular fluid purification apparatus according to the embodiment of FIG. 1.

FIG. 3 is a perspective view illustrating a tubular fluid purification apparatus according to another embodiment of the present disclosure.

FIG. 4 is a perspective view illustrating a tubular fluid purification apparatus according to yet another embodiment of the present disclosure.

FIG. 5 illustrates the shapes of a plurality of purification units of the tubular fluid purification apparatus of FIG. 4.

FIG. 6 is a view illustrating the operation of the tubular fluid purification apparatus according to the embodiment of FIG. 4.

MODE FOR THE INVENTION

Embodiments of the present disclosure will hereinafter be described in detail with reference to the accompanying drawings. It should be noted that the drawings are not to precise scale and may be exaggerated in thickness of lines or sizes of components for descriptive convenience and clarity only. Furthermore, the terms as used herein are defined by taking functions of the present disclosure into account and can be changed according to the custom or intention of users or operators. Therefore, definition of the terms should be made according to the overall disclosures set forth herein.

In the present specification, when an element is referred to as being 'over' or 'under' another element, it may indicate that the former element is directly positioned 'over' or 'under' the latter element or an additional element is interposed therebetween. In the present specification, the terms such as 'upper' and 'lower' are the relative concept set from the viewpoint of an observer. Thus, when the viewpoint of the observer is changed, 'upper' may indicate 'lower', and 'lower' may indicate 'upper'.

In the plurality of drawings, like reference numerals represent substantially the same elements. Furthermore, the terms of a singular form may include plural forms unless referred to the contrary, and the term such as 'include' or 'have' specifies the existence of a property, a number, a step, an operation, a component, a part, or a combination thereof, and does not exclude one or more other properties, numbers, steps, operations, components, or combinations thereof.

FIG. 1 is a perspective view illustrating a tubular fluid purification apparatus according to an embodiment of the present disclosure. Referring to FIG. 1, the tubular fluid purification apparatus 10 includes a guide part 11, a conduit part 12 and a discharge part 13 which form a tubular main body 100. The tubular fluid purification apparatus 10 further includes a purification unit 120 which is disposed in the conduit part 12.

The guide part 11 is formed with an inlet port 110 disposed in a first end of the tubular fluid purification apparatus 10 and functions to guide fluid from the outside into the main body 100. The guide part 11 may include a threaded connection groove 111 for connection with an external pipe. The guide part 11 may include a first introduction part 11a which has a constant cross-section A11a with respect to a longitudinal direction (that is, an X-axis direction), and a second introduction part 11b which has a cross-section that increases in the longitudinal direction (X-axis direction). The second introduction part 11b may have a cross-section A12 equal to that of the conduit part 12 at the junction with the conduit part 12. As such, the guide part 11 may be configured such that the cross-section thereof is equal to or less than that of the conduit part 12.

Referring to FIG. 1, the first introduction part 11a may have a first diameter L11. The second introduction part 11b may have a diameter that increases in the longitudinal direction. The second introduction part 11b may have a second diameter L12 at the junction with the conduit part 12.

The conduit part 12 may form space for the flow of fluid between the guide part 11 and the discharge part 13. As shown in the drawing, the conduit part 12 may have a constant cross-section A12 with respect to the longitudinal direction (X-axis direction).

The purification unit 120 may be supported on an inner surface of the conduit part 12 and disposed to face fluid that flows from the guide part 11 to the discharge 13. The purification unit 120 may be oriented in a direction (Y-axis direction) perpendicular to the longitudinal direction (X-axis direction) of the conduit part 12 and cover the cross-section A12 of the conduit part 12.

The purification unit 120 may include a vortex generation part 121, and a light emitting diode 122 which provide ultraviolet light. The vortex generation part 121 may include a support 121a, and an opening 121b which is formed in the support 121a. The support 121a may be fixed on the inner surface of the conduit part 12. For example, the support 121a may be installed in such a way that a groove is formed around the inner surface of the conduit part 12 and an outer circumferential edge of the support 121a is fitted into the groove.

The light emitting diode 122 may be mounted to the support 121a. Although not shown, a plurality of printed circuit patterns for supplying power from the outside to the light emitting diode 122 may be disposed in the support 121a. Although not shown, a power supply which supplies power to the light emitting diode 122, and a wiring unit which connects the power supply to the printed circuit patters of the support 121a may be provided outside the tubular fluid purification apparatus 10.

Fluid that is drawn from the guide part 11 to the conduit part 12 can be moved to the discharge part 13 through the opening 121b of the vortex generation part 121. Some of the fluid may collide with the support 121a and forms vortexes before passing through the opening 121b. In the case of the fluid that has formed the vortexes, the time it takes for the fluid to remain around the purification unit 120 can be increased.

The light emitting diode 122 may be disposed on the support 121a at a position adjacent to the opening 121b. In the present specification, the term "light emitting diode" may include the meaning of a light emitting diode chip, a light emitting diode chip package, or the like. In an embodiment, a light diode chip may be directly mounted, in a COB (chip on board) form, to the support 121a having the printed circuit patterns. In another embodiment, a light emitting chip package may be mounted to the support 121a having the printed circuit patterns.

In the present embodiment, the light emitting diode 122 may emit ultraviolet light having a wavelength region ranging from approximately 200 nm to approximately 400 nm so as to sterilize or deodorize fluid. Referring to the drawings, the light emitting diode 122 may be disposed in a direction facing the fluid. In other words, the light emitting diode 122 may be disposed to face the guide part 11. At least one light emitting diode 122 may be provided. In the case where a plurality of light emitting diodes 122 are provided, they may be disposed on the support 121 in various row and column arrangements.

The discharge part 13 can discharge fluid purified by the purification unit 120 to the outside. The discharge part 13 may have an outlet port 130 disposed in a second end of the tubular fluid purification apparatus 10. The discharge part 13 may include a threaded connection groove 131 for connection with an external pipe. The discharge part 13 may include a first discharge part 13a which has a constant cross-section A13a with respect to the longitudinal direction (that is, the X-axis direction), and a second discharge part 13b which has a cross-section that reduces in the longitudinal direction (X-axis direction). The second discharge part 13b may have a cross-section A12 equal to that of the conduit part 12 at the junction with the conduit part 12. As such, the discharge part 13 may be configured such that the cross-section thereof is equal to or less than that of the conduit part 12.

As described above, the tubular fluid purification apparatus 10 can be provided as a module type connector including the guide part 11, the conduit part 12 and the discharge part 13. The guide part 11 and the discharge part 13 can be connected to respective external pipes.

FIG. 2 is a view illustrating the operation of the tubular fluid purification apparatus according to the embodiment of FIG. 1. As shown in FIG. 2, the guide part 11 of the tubular fluid purification apparatus 10 may be coupled to a first external pipe 21, and the discharge part 13 may be coupled to a second external pipe 22. In an example of a coupling method, the first external pipe 21 may include a thread corresponding to the threaded connection groove 111 of the first introduction part 11a, and the guide part 11 may be coupled to the first external pipe 21 by engaging the thread with the threaded connection groove 111. In another example of the coupling method, a separate coupler may be used to couple the first external pipe 21 and the first introduction part 11a to each other. An example of the coupler may include a fastening device such as a clamp, a valve, etc. The above-mentioned coupling method may also be applied to the coupling between the first discharge part 13a and the second external pipe 22 in the same manner.

Fluid is drawn from the first external pipe 21 into the guide part 11. The fluid can be purified by the purification unit 120 in the conduit part 12. Purified fluid can be transferred to the second external pipe 22 via the discharge part 13.

Referring to FIG. 2, fluid F21 that flows through the first external pipe 21 can be moved into the conduit part 12 via the guide part 11. In the conduit part 12, some of the fluid F21 may collide with the support 121a of the purification unit 120 and thus form vortexes Fb. Furthermore, some of the fluid F21 may move to the discharge part 13 through the opening 121b of the purification unit 120. The vortexes Fb increase the time it takes for fluid to remain around the purification unit 120. After a period of time has passed, fluid that has formed vortexes Fb can move to the discharge part 13 through the opening 121b.

In the above-mentioned configuration, when fluid drawn from the outside into the guide part 11 is moved from the first introduction part 11a to the second introduction part 11b, the flow rate of fluid can be reduced because the cross-sectional area of the guide part 11 increases in the direction in which the fluid flows. Therefore, when fluid reaches the conduit part 12, the flow rate of fluid can be reduced to a sufficiently low level. Such a reduction in the flow rate of fluid can increase the time it takes for fluid to remain around the purification unit 120.

The ultraviolet light emitting diode of the purification unit 120 provides ultraviolet light having a predetermined wavelength to more effectively sterilize or deodorize fluid F21 in the conduit part 12.

As described above, in the present embodiment, the time it takes for fluid to remain around the purification unit 120 can be increased by the vortex generation part 121 of the purification unit 120. Furthermore, the flow rate of fluid can be reduced by a difference in cross-sectional area between the guide part 11 and the conduit part 12. Consequently, a rate of exposure of fluid to sterilizing or deodorizing ultraviolet light emitted from the ultraviolet light emitting diode can be increased, whereby efficiency of sterilizing or deodorizing fluid can be enhanced.

FIG. 3 is a perspective view illustrating a tubular fluid purification apparatus according to another embodiment of the present disclosure. Referring to FIG. 3, the tubular fluid purification apparatus 30 is configured such that a guide part 31 and a discharge part 33 have the same cross-sectional area as that of a conduit part 32, unlike the configuration of the tubular fluid purification apparatus 10 described with reference to FIGS. 1 and 2.

As shown in the drawing, the tubular fluid purification apparatus 30 can be provided as a module type connector including the guide part 31, the conduit part 32 and the discharge part 33. The guide part 31 and the discharge part 33 respectively have an inlet port 310 and an outlet port 330 and each may be connected to an external pipe.

In another embodiment (not shown), the tubular fluid purification apparatus 30 may be embodied by disposing the purification unit 120 in a desired fluid pipe. In other words, rather than having a module type configuration, the tubular fluid purification apparatus 30 may be configured in such a way that only the purification unit 120 is separately installed on an inner surface of a desired fluid pipe. The operation of sterilizing and deodorizing fluid that flows through the fluid pipe can be performed using a vortex generation part 121 and a light emitting diode 122 of the purification unit 120.

FIG. 4 is a perspective view illustrating a tubular fluid purification apparatus according to yet another embodiment of the present disclosure. FIG. 5 illustrates the shapes of a plurality of purification units of the tubular fluid purification apparatus of FIG. 4.

Referring to FIG. 4, the tubular fluid purification apparatus 40 may include two or more purification units 420 and 425 installed in the conduit part 12, unlike the tubular fluid purification apparatus 10 of FIGS. 1 and 2. Although the two purification units including the first purification unit 420 and the second purification unit 425 are illustrated as one example in the present embodiment, it is not limited to this. For instance, more than two purification units may be successively arranged in the conduit part 12 in a direction in which fluid flows.

In detail, the first purification unit 420 may include a first vortex generation part 421 and a first light emitting diode 422. The first vortex generation part 421 may include a first support 421a, and a first opening 421b which is formed in the first support 421a. The second purification unit 425 may include a second vortex generation part 426 and a second light emitting diode 427. The second vortex generation part 426 may include a second support 426a, and a second opening 426b.

In the case where the plurality of purification units are disposed in the conduit part 12, the centers of the openings formed in the respective purification units may be misaligned from each other. As shown in FIGS. 4, 5a and 5b, in the case where the first purification unit 420 and the second purification unit 425 are successively arranged in the longitudinal direction (X-axial direction), a center 421c of each first opening 421b and a center 426c of the associated second opening 426b may be misaligned from each other with respect to the longitudinal direction. In addition, a center 422c of each first light emitting diode 422 and a center 427c of the associated second light emitting diode 427 may be misaligned from each other with respect to the longitudinal direction.

Therefore, when fluid that has passed through the first opening 421b flows in the longitudinal direction of the conduit part 12, the fluid can be prevented from directly passing through the second opening 426b, because each first opening 421b and the associated second opening 426b are positioned to be misaligned from each other. Thereby, the flow rate at which fluid that has passed through the first opening 421b passes through the second opening 426b can be reduced. Consequently, a rate of exposure of fluid to ultraviolet light emitted from the second light emitting diodes 427 can be increased.

The operation of the tubular fluid purification apparatus having the above-mentioned configuration will be explained with reference to FIG. 6.

FIG. 6 is a view illustrating the operation of the tubular fluid purification apparatus according to the embodiment of FIG. 4. As shown in FIG. 6, the guide part 11 of the tubular fluid purification apparatus 40 may be coupled to a first external pipe 51, and the discharge part 13 may be coupled to a second external pipe 52. In an example of a coupling method, the first external pipe 51 may include a thread corresponding to the threaded connection groove 111 of the first introduction part 11a, and the guide part 11 may be coupled to the first external pipe 51 by engaging the thread with the threaded connection groove 111. In another example of the coupling method, a separate coupler may be used to couple the first external pipe 51 and the first introduction part 11a to each other. An example of the coupler may include a fastening device such as a clamp, a valve, etc. The above-mentioned coupling method may also be applied to the coupling between the first discharge part 13a and the second external pipe 52 in the same manner.

Fluid is drawn from the first external pipe 51 into the guide part 11. The fluid can be purified by the plurality of purification units 420 and 425. Purified fluid can be transferred to the second external pipe 52 via the discharge part 13.

Referring to FIG. 6, fluid F61 flowing through the first external pipe 61 can be moved to the conduit part 12 via the guide part 11. In the conduit part 12, some of the fluid F61 may collide with the support 421a of the first vortex generation part 421 and thus form first vortexes Fb1. Furthermore, some Ft1 of the fluid F61 may pass through the first purification unit 420 via the first openings 421b of the first vortex generation part 421. In the case of the fluid that has formed the first vortexes Fb1, the time it takes for the fluid to remain around the first purification unit 420 can be relatively increased. After a period of time has passed, the fluid that has formed the first vortexes Fb1 can pass through the first purification unit 420 via the first openings 421b and move to the second purification unit 425.

Some of the fluid Ft1 that has passed through the first purification unit 420 may collide with the second support 426a of the second vortex generation part 426 and thus form second vortexes Fb2. Furthermore, some Ft2 of the fluid Ft1 may pass through the second purification unit 425 via the second openings 426b of the second vortex generation part 426. In the case of the fluid that has formed the second vortexes Fb2, the time it takes for the fluid to remain around the second purification unit 425 can be comparatively increased. After a period of time has passed, the fluid that has formed the second vortexes Fb2 can pass through the second purification unit 425 via the second openings 426b and move to the discharge part 13.

The first vortexes Fb1 and the second vortexes Fb2 respectively increase the time it takes for fluid to remain the first purification unit 420 and the second purification unit 425, whereby a rate of exposure of fluid to ultraviolet light emitted from the first and second light emitting diodes 422 and 427 can be increased. Consequently, efficiency of sterilizing or deodorizing fluid using ultraviolet light can be enhanced.

Furthermore, in the above-mentioned configuration, when fluid drawn from the outside into the guide part 11 is moved from the first introduction part 11a to the second introduction part 11b, the flow rate of fluid can be reduced because the cross-sectional area of the guide part 11 increases in the direction in which the fluid flows. Therefore, when fluid reaches the conduit part 12, the flow rate of fluid can be reduced to a sufficiently low level. Such a reduction in flow rate of fluid can increase time it takes for fluid to remain around the purification units 420 and 425. As a result, efficiency of sterilizing or deodorizing fluid using ultraviolet light emitted from the first and second light emitting diodes 422 and 427 can be enhanced.

As described above, in the present disclosure, the time it takes for fluid to remain around the purification unit 120 can be increased by the vortex generation part of the purification unit 120. In addition, the flow rate of fluid can be reduced by a difference in cross-sectional area between the guide part 11 and the conduit part 12. Consequently, a rate of exposure of fluid to sterilizing or deodorizing ultraviolet light emitted from the ultraviolet light emitting diode can be increased, whereby efficiency of sterilizing or deodorizing fluid can be enhanced.

Although some embodiments have been provided to illustrate the present disclosure in conjunction with the drawings, it will be apparent to those skilled in the art that the embodiments are given by way of illustration only, and that various modifications and equivalent embodiments can be made without departing from the spirit and scope of the present disclosure. The scope of the present disclosure should be limited only by the accompanying claims.

The invention claimed is:

1. A tubular fluid purification apparatus comprising:
   a guide part including an inlet port through which a fluid is introduced;
   a discharge part including an outlet port through which the fluid is discharged;
   a conduit part arranged between the guide part and the discharge part and configured to provide a passage for the fluid to flow in a longitudinal direction of the tubular fluid purification apparatus; and
   a purification unit supported on an inner surface of the conduit part and disposed to face the fluid flowing from the guide part to the discharge part, and
   wherein the purification unit comprises:
   a vortex generation part including a support disposed along a direction perpendicular to the longitudinal direction of the tubular fluid and at least one opening formed in the support, wherein the fluid flowing from the guide part to the discharge part collides with the support to form vortexes to increase time for the fluid collided with the support to remain around the purification unit; and
   at least one light emitting diode disposed on the support at a position adjacent to a corresponding opening and configured to provide ultraviolet light to the fluid,
   wherein the guide part includes a first portion and a second portion having a cross-section area greater than that of the first portion and the second portion is located closer to the vortex generation part than the first portion is.

2. The tubular fluid purification apparatus according to claim 1, wherein the purification unit is disposed to cover a cross-section area of the conduit part.

3. The tubular fluid purification apparatus according to claim 1, wherein the purification unit is disposed across the conduit part in a direction perpendicular to a longitudinal direction of the conduit part.

4. The tubular fluid purification apparatus according to claim 1, wherein a cross-sectional area of at least a portion of the guide part and the discharge part is equal to or less than a cross-sectional area of the conduit part.

5. The tubular fluid purification apparatus according to claim 1, wherein the light emitting diode is disposed to provide ultraviolet light in a direction facing the fluid to sterilize or deodorize the fluid.

6. The tubular fluid purification apparatus according to claim 5, wherein the at least one opening allows the sterilized or deodorized fluid to flow toward the discharge part.

7. The tubular fluid purification apparatus according to claim 1, wherein the vortex generation part generates a vortex in the fluid around the at least one opening and structured to cause the fluid to remain for an increased time around the light emitting diode.

8. The tubular fluid purification apparatus according to claim 1, wherein the at least one additional opening has a center misaligned from that of the at least one of the opening along a longitudinal direction of the conduit part.

9. The tubular fluid purification apparatus according to claim 1, wherein at least one of the guide part and the discharge part comprises:
   a first part having a constant diameter in a direction in which the fluid flows; and
   a second part having a diameter varying in the direction in which the fluid flows.

10. The tubular fluid purification apparatus according to claim 9, wherein the second part is configured such that the diameter thereof is increased toward the conduit part.

11. The tubular fluid purification apparatus according to claim 1, wherein each of the inlet port and the outlet port includes a coupling part connected with a pipe.

12. A tubular fluid purification apparatus comprising:
a guide part including an inlet port through which a fluid is introduced;
a discharge part including an outlet port through which the fluid is discharged;
a conduit part arranged between the guide part and the discharge part and configured to provide a passage for the fluid to flow; and
a purification unit supported on an inner surface of the conduit part and disposed to face the fluid flowing from the guide part to the discharge part, and
wherein the purification unit comprises:
a vortex generation part including a support and at least one opening formed in the support; and
at least one light emitting diode disposed on the support at a position adjacent to a corresponding opening and configured to provide ultraviolet light to the fluid,
wherein the tubular fluid purification apparatus further comprises:
an additional purification unit disposed adjacent to the purification unit in a direction in which the fluid flows, wherein the additional purification unit comprises:
an additional vortex generation part including an additional support and at least one additional opening formed in the additional support; and
at least one additional light emitting diode disposed on the additional support, and
wherein the additional purification unit differs from the purification unit in size and numbers of the openings and the light emitting diodes.

13. The tubular fluid purification apparatus according to claim 12, wherein the guide part and the discharge part have a same cross-sectional area.

14. A tubular fluid purification apparatus comprising:
an inlet port including a first portion through which a fluid introduced with a first speed and a second portion arranged adjacent to the first portion in a direction that the fluid flows, the second portion having an increased cross section area than that of the first portion and structured to cause the fluid to flow with a second speed lower than the first speed;
a conduit part connected to the second portion and providing a passage for the fluid to flow through;
a purification part arranged in the conduit and across the passage in a direction perpendicular to a direction in which the fluid flows, the purification part structured to generate a vortex and cause the fluid to stay for the purification for an increased time; wherein the purification part includes at least one opening through which the fluid flows and a light emitting diode for radiating ultraviolet light for sterilizing or deodorizing the fluid
a discharge port connected to the conduit part and configured to discharge the fluid and an additional purification part disposed adjacent to the purification part in a direction in which the fluid flows, wherein the additional purification part is structured to generate a vortex and cause the fluid to stay for the purification for an increased time, wherein the additional purification part includes at least one opening through which the fluid flows and at least one additional light emitting diode, wherein additional purification part differs from the purification part in size and numbers of the openings and the light emitting diodes.

15. The tubular fluid purification apparatus according to claim 14, wherein the discharge port includes a first portion and a second portion that are arranged along a direction that the fluid flows, the first portion having a varying cross section area and the second portion having a constant cross section area.

16. The tubular fluid purification apparatus according to claim 14, further comprising:
an additional purification part disposed adjacent to the purification part in a direction in which the fluid flows, wherein the additional purification part structured to generate an additional vortex and cause the fluid to stay for the purification for an increased time.

17. The tubular fluid purification apparatus according to claim 14, wherein the additional purification part includes an additional opening through which the fluid flows and an additional light emitting diode for radiating ultraviolet light for sterilizing or deodorizing the fluid and the additional opening not aligned with the opening.

18. The tubular fluid purification apparatus according to claim 14, wherein at least one of the inlet port and the discharge port are connectable with an external pipe.

* * * * *